UNITED STATES PATENT OFFICE 2,455,689

STABILIZATION OF UNSATURATED NITRILES

Kenneth E. Marple, Oakland, and Bert Borders, San Francisco, Calif., assignors to Shell Development Company, San Francisco, Calif., a corporation of Delaware No Drawing. Application November 6, 1946, Serial No. 708,197

9 Claims. (Cl. 260—465.9)

This invention relates to the stabilization of unsaturated nitriles. The invention more particularly relates to a method for the prevention or inhibition of the auto-polymerization of unsaturated nitriles. The invention also relates to the stabilized compositions of matter resulting from the application of such a method.

More specifically the invention herein described relates to the method of stabilizing alpha, beta-unsaturated nitriles against auto-polymerization which comprises incorporation with the unsaturated nitriles of a stabilizing amount of a cyanohydrin, and to the stabilized compositions of matter resulting from the application of such a method.

On exposure to air for extended periods of time as might be required in storage or shipping, or on exposure to light or elevated temperatures, unsaturated nitriles readily undergo auto-polymerization. The products resulting from such a polymerization of the unsaturated nitriles are of no value as substitutes for the monomeric unsaturated nitriles in their various applications. Polymerized acrylonitrile, for example, cannot be used as a substitute for the monomeric acrylonitrile in the production of synthetic rubber. In this process as in many of the other reactions of the unsaturated nitriles it is of utmost importance that the nitriles be used in the monomeric form. To use the unsaturated nitriles for their commercial purposes it is essential, therefore, that a method be found for the preservation of the unsaturated nitriles in the monomeric form during their storage or exposure to elevated temperatures.

Attempts have been made in the past to prevent the auto-polymerization of the unsaturated nitriles by the incorporation of polymerization inhibitors with the nitriles. The inhibitors that have been proposed heretofore have proved unsatisfactory either because of the large quantity of inhibitor which must be added or because of the difficulty incident to the removal of the inhibitor after it has served its purpose. Other commonly used inhibitors impart undesirable colors or odors to the nitriles while others have been found to actually increase rather than retard the polymerization of these compounds.

It is an object of the invention, therefore, to overcome the difficulties encountered in the past and to provide a practical and highly effective method for substantially preventing or inhibiting the autopolymerization that the unsaturated nitriles undergo when they are exposed to air and light for extended periods of time or subjected to elevated temperatures. Such stabilized nitriles either by themselves or in admixture with other material can be stored for long periods of time in air and light and exposed to elevated temperatures without any polymerization taking place. Being free of such polymerization the unsaturated nitriles can readily be used to produce synthetic rubber and a great many other commercially important products.

It has now been discovered that the auto-polymerization occurring in the unsaturated nitriles when they are allowed to stand in air or light or exposure to elevated temperatures may be prevented or inhibited and the nitriles kept in substantially the monomeric form by the incorporation with the unsaturated nitriles or unsaturated nitrile compositions of a stabilizing amount of a cyanohydrin. By the term "stabilizing amount" is meant an amount of a cyanohydrin or mixture of cyanohydrins effective to stabilize the unsaturated nitriles against auto-polymerization. Such stabilized nitriles can readily be stored, exposed to air, light and heat for long periods without any resulting auto-polymerization.

The inhibitors provided by the present invention possess none of the undesirable characteristics of the previously used inhibitors as they do not impart any objectionable color to the nitriles, are used effectively in low concentrations, and do not impart any undesirable odor to the nitriles and nitrile compositions. In a great many cases it is unnecessary to separate the inhibitor prior to the use of the nitrile. In those cases, however, when separation of the inhibitor is considered desirable, it is easily accomplished, usually by ordinary distillation.

Any alpha,beta-unsaturated nitrile may be stabilized by the present invention. Compounds embraced by the term "alpha,beta-unsaturated nitrile" are those compounds of the general formula:

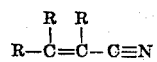

wherein R represents the same or different substituents comprising a hydrogen atom, a halogen atom or an organic radical.

The halogen atoms which may be directly attached to one or more of the carbon atoms of the above-described general formula as represented by R may be any halogen atom, but are preferably, chlorine, bromine or iodine, and more preferably chlorine atoms.

R in the above general formula may be any organic radical. Preferred organic radicals are the hydrocarbon radicals and the substituted organic radicals. The more preferred of the two groups of radicals are the hydrocarbon radicals which may be cyclic or acyclic, saturated, unsaturated or aromatic, such as the alkyl, alkenyl, aryl, alkaryl, alkenaryl, aralkyl, aralkenyl, cycloalkyl and cycloalkenyl radicals. Examples of the hydrocarbon radicals are methyl, ethyl, propyl, isopropyl, normal butyl, isobutyl, secondary butyl, tertiary butyl, isopentyl, secondary pentyl, hexyl, normal octyl, iso-octyl, trimethyl, octodecyl, allyl, methallyl, methyl vinyl carbinyl, pentenyl, hexenyl, phenyl, diphenyl, naphthyl, anthryl, tolyl, secondary butyl-naphthyl, dipropyl-naphthyl, cyclohexenyl, trimethyl-cyclohexyl, cyclopentenyl, etc.

The substituted hydrocarbon radicals, represented by R, are those hydrocarbon radicals described above wherein one or more hydrogen atoms have been replaced by an inorganic element or radical or by an organic radical containing one or more oxygen, nitrogen or sulfur atoms. Examples of the organic radicals, containing inorganic elements, that may be attached to the hydrocarbon radicals are the chlorine, bromine and iodine atoms, and the sulfate, sulfite, nitrate and nitrite radicals. Examples of the organic radicals, containing inorganic elements, that may be attached to the hydrocarbon radicals are the hydroxyl, carboxyl, ether, thioether, etc. radicals.

The radicals which R may represent also include the heterocyclic radicals in which an oxygen, nitrogen, sulfur, etc. atom or atoms is included in the ring system. Examples of such radicals are furfuryl, thiophenyl, sulfolanyl, pyridinyl, etc.

Examples of: unsaturated nitriles coming within the scope of the present invention are:

Acrylonitrile
Methacrylonitrile
Crotonitrile
Alpha-ethyl acrylonitrile
Alpha-propyl acrylonitrile
Alpha,beta-dimethyl acrylonitrile
Beta-ethyl acrylonitrile
Alpha-phenyl acrylonitrile
Alpha-naphthyl acrylonitrile
Alpha-(2-chloro-butyl) acrylonitrile
Alpha-(4-hydroxy-phenyl) acrylonitrile
Alpha-furfuryl acrylonitrile
Beta-(2-chloro-ethyl) acrylonitrile
Alpha-butyl acrylonitrile
Beta-hexyl acrylonitrile A group of the above described alpha,beta-unsaturated nitriles which are particularly active in the formation of polymers when allowed to stand alone in air or when exposed to elevated temperatures and which are readily stabilized by the method of the invention are those unsaturated nitriles according to the above described general formula wherein all of the R's are hydrogen atoms or wherein two of the R's are hydrogen atoms and the remaining R is a hydrocarbon radical containing from 1 to 18 carbon atoms. Examples of such a group are Acrylonitrile
Methacrylonitrile
Crotonitrile
Beta-ethyl acrylonitrile
Beta-hexyl acrylonitrile
Alpha-pentyl acrylonitrile
Beta-octyl acrylonitrile
Beta-n-decyl acrylonitrile The unsaturated nitrile stabilizing agents or auto-polymerization inhibiting agents used in accordance with the present invention are termed "cyanohydrins." By this term is embraced all those compounds coming within the general formula

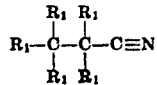

wherein one of the substituents represented by $R_1$ is a hydroxyl group and the remaining R's represent the same or different substituents comprising a hydrogen atom, a halogen atom or an alkyl, aryl, aralkyl, alkenyl, aralkenyl, alicyclic or heterocyclic radical which itself may contain substituted groups or elements.

Representative examples of some of the substituted or unsubstituted hydrocarbon radicals which $R_1$ represents in the above described general formula for the cyanohydrins are methyl, chloromethyl, 2,2-dichloroethyl, propyl, isopropyl, n-butyl, 2-chloroisobutyl, 2-hydroxyisobutyl, isopentyl, hexyl, octyl, iso-octyl, octodecyl, 2-ketopropyl, allyl, 2-bromoallyl, 3-pentenyl, phenyl, 2,4-dibromophenyl, diphenyl, naphthyl, anthryl, tolyl, sec-butyl-2-naphthyl, 2,3,5-trimethylcyclohexyl, cyclopentenyl, 6-carboxyl-3-pentenyl, and the like.

The radicals which $R_1$ may represent also includes the heterocyclic radicals such as the furfuryl, tetrahydrofurfuryl, sulfolanyl and pyridinyl radicals and the like and their homologues and analogues.

Representative examples of the above described cyanohydrins which are used to stabilize the unsaturated nitriles against auto-polymerization are Ethylene cyanohydrin
Ethylidene cyanohydrin
1-hydroxy-1-cyanopropane
2-hydroxy-1-cyanopropane
1-hydroxy-1-cyanobutane
1-hydroxy-1-cyano-3-butene
1-hydroxy-1-cyano-butyl cyclohexane
2-hydroxy-1-cyano-5,5-dichloropentane The specific cyanohydrin used in each case will depend upon the specific unsaturated nitrile being stabilized and can readily be determined by a few preliminary tests. In most cases those cyanohydrins having substantially the same number of carbon atoms as the particular nitrile being stabilized are the best inhibitors. In the case of acrylonitrile, for example, ethylene cyanohydrin is preferably employed, while in the case of methacrylonitrile hydroxypropionitrile is preferred.

The amount of stabilizing substance which may be most effectively added to the unsaturated nitriles is variable depending upon many factors such as the particular nitrile to be stabilized, the stabilizer used, the subsequent treatment to which the stabilized mixture is to be subjected, the storage time, etc. The smallest effective amount of the stabilizer that should be used generally lies between about 0.1% and about 2% by weight of the unsaturated nitrile being stabilized. Smaller amounts are not usually effective as, for example, it has been found that minute quantity of cyanohydrin found in the purified nitriles produced by the dehydration of certain cyanohydrins is not sufficient to successfully prevent the autopolymerization of the nitrile. Approximately the same amount of stabilizer should be added to those nitriles produced by the dehydration of cyanohydrin method as that added to nitriles produced by the various other methods. In general the upper limit of the amount of stabilizing agent required should not exceed approximately 4% by weight of the substance being stabilized.

The inhibitor may be added following final purification of the unsaturated nitrile or at some stage during the preparation or purification of the nitrile. When it is added to a reaction mixture from which the nitrile is to be separated by distillation the conditions of the distillation should not of course, be such as to destroy or inactivate the inhibitor.

The stabilizing agent may be added to the material being stabilized in any desirable manner. The cyanohydrin may be added per se or suspended or dissolved in a suitable media. It is generally desirable to select the specific stabilizing material with respect to the unsaturated nitrile to be stabilized so that the former is soluble to the desired extent in the latter. It may be desirable to select the stabilizing agent with respect to the nitrile to be stabilized so that it may, if desired be subsequently separated herefrom by some convenient means as distillation, extraction, etc.

The material to be stabilized in accordance with the invention may consist of one or more of the above described unsaturated nitriles. The nitriles to be stabilized may be in admixture with an organic solvent or diluent. The material may also consist of a reaction medium of various components one of which is an unsaturated nitrile whose polymerization is to be prevented during the course of the reaction.

The invention also embraces the stabilization of compositions comprising or consisting of any of the above described unsaturated nitriles whose presence in the composition is desired in the monomeric form. The stabilizing agent may be added to the unsaturated nitrile before it is added to the composition medium or the stabilizing agent may be added to the composition with the unsaturated nitrile. The composition to which the stabilized nitrile or unsaturated nitrile alone is added may be in any form desired as being dissolved in a solvent, etc.

To illustrate the effectiveness of some representative cyanohydrins in inhibiting the formation of polymers in the unsaturated nitriles the following examples are given. It is to be understood that the examples are for the purpose of illustration and the invention is not to be regarded as limited to the specific nitriles stabilized nor to the specific cyanohydrins and mixtures thereof recited.

As the auto-polymerization of unsaturated nitriles is accelerated by heat and exposure to light, the value of the cyanohydrins in stabilizing the nitriles against such polymerization is best shown by exposing the unsaturated nitrile and cyanohydrin mixture to one or both of these agents.

*Example I*

To illustrate the auto-polymerization that takes place in the unsaturated nitriles when the stabilizing agent is not present, samples of acrylonitrile are exposed to direct sunlight for 7 days. After that period the samples have almost completely polymerized to form a solid mass.

However, when samples of acrylonitrile containing about 0.1% by weight of ethylene cyanohydrin are placed in the direct sunlight and allow to remain for 7 days, no polymerization or discoloration is detected after that period of time. Slight polymerization begins to appear only after an exposure to sunlight for 21 days.

*Example II*

Samples of acrylonitrile are irradiated with an ultra-violet lamp (General Electric Mazda A-H-4 with outside glass jacket removed). The samples are placed about 1 foot from the lamp and allowed to remain there for a period of seven days. After that period of heat and light treatment the samples had polymerized into a solid mass.

When samples of acrylonitrile containing about 0.1% by weight of ethylene cyanohydrin, however, are irradiated with the ultra-violet lamp, no polymerization or discoloration of the samples are detected even after 51 days of the treatment.

*Example III*

Samples of methacrylonitrile are irradiated with the ultra-violet lamp and at the end of 21 days the samples have polymerized to solids.

However, when the samples of methacrylonitrile containing about 0.1% by weight of hydroxypropionitrile are irradiated with the ultra-violet lamp no polymerization or discoloration is detected even after 21 days of treatment.

*Example IV*

Samples of crotonitrile are exposed to direct sunlight for 7 days. After that period the samples have almost completely polymerized to a solid mass. Other samples of crotonitrile are exposed to the ultra-violet lamp. At the end of 7 days treatment the samples have undergone auto-polymerization to form a slightly solid mass.

Samples of crotonitrile are then treated with about 0.1% by weight of ethylene cyanohydrin and exposed to the sunlight and to the ultra-violet lamp. After a period of 21 days of both treatments very little polymerization or discoloration are detected.

*Example V*

Samples of alpha-ethyl acrylonitrile, alpha-propyl acrylonitrile, beta-ethyl acrylonitrile, alpha-phenyl acrylonitrile, and alpha-beta-dimethyl acrylonitrile are stabilized against auto-polymerization by treating each sample with about 0.1% by weight of ethylene cyanohydrin. After three weeks of exposure to the ultra-violet lamp very little if any polymerization or discoloration is detected in the above samples.

We claim as our invention:

1. The method of inhibiting the auto-polymerization of acrylonitrile which comprises incorporating therewith from about 0.1% to about 2% by weight of ethylene cyanohydrin.

2. The method of inhibiting the auto-polymerization of methacrylonitrile which comprises incorporating therewith from about 0.1% to about 2% by weight of hydroxypropionitrile.

3. The method of stabilizing crotonitrile against auto-polymerization which comprises adding thereto from about 0.1% to about 2% by weight of ethylene cyanohydrin.

4. The method of inhibiting the auto-polymerization of a nitrile selected from the group consisting of acrylonitrile, alpha-substituted acrylonitriles wherein the substituent on the alpha carbon atom is a lower alkyl radical, and beta-substituted acrylonitriles wherein the substituent on the beta carbon atom is a lower alkyl radical, which comprises incorporating therewith from 0.1% to 4% by weight of ethylene cyanohydrin.

5. The method of inhibiting the auto-polymerization of a nitrile selected from the group consisting of acrylonitrile, alpha-substituted acrylonitriles wherein the substituent on the alpha carbon atom is a lower alkyl radical, and beta-substituted acrylonitriles wherein the substituent on the beta carbon atom is a lower alkyl radical, which comprises incorporating therewith from 0.1% to 4% by weight of a cyanohydrin.

6. As a composition of matter acrylonitrile containing 0.1% to 2% by weight of ethylene cyanohydrin dissolved therein, said composition being stabilized against auto-polymerization.

7. As a composition of matter methacrylonitrile containing 0.1% to 2% by weight of hydroxypropionitrile dissolved therein, said composition being stabilized against auto-polymerization.

8. As a composition of matter a nitrile selected from the goup consisting of acrylonitrile, alpha-substituted acrylonitriles wherein the substituent on the alpha carbon atom is a lower alkyl radical, and beta-substituted acrylonitriles wherein the substituent on the beta carbon atom is a lower alkyl radical, containing from 0.1% to 4% by weight of ethylene cyanohydrin dissolved therein, said composition being stabilized against auto-polymerization.

9. As a composition of matter a nitrile selected from the group consisting of acrylonitrile, alpha-substituted acrylonitriles wherein the substituent on the alpha carbon atom is a lower alkyl radical, and beta-substituted acrylonitriles wherein the substituent on the beta carbon atom is a lower alkyl radical, containing from 0.1% to 4% by weight of a cyanohydrin dissolved therein, said composition being stabilized against auto-polymerization.

KENNETH E. MARPLE.
BERT BORDERS.

REFERENCES CITED

The following references are of record in the file of this patent:

UNITED STATES PATENTS

| Number | Name | Date |
|---|---|---|
| 2,333,782 | Hansley | Nov. 9, 1943 |
| 2,392,303 | Balcar | Jan. 8, 1946 |
| 2,432,511 | Davis et al. | Dec. 16, 1947 |